Figure 2:
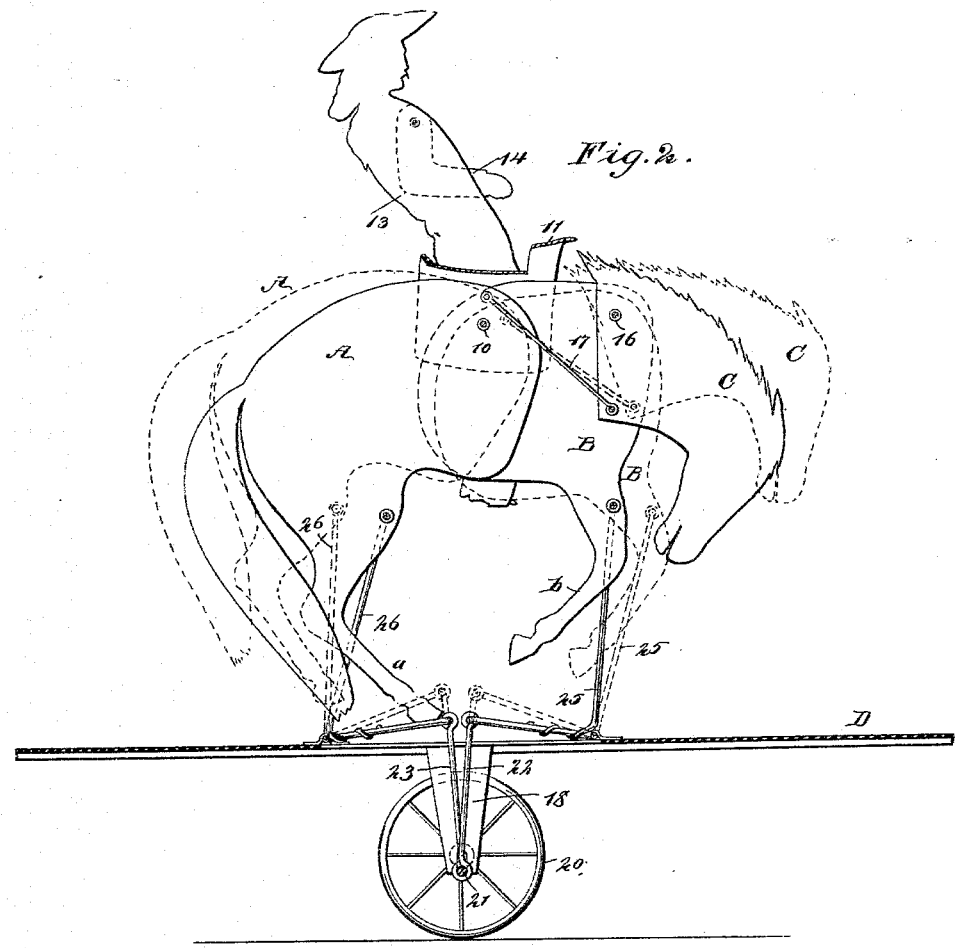

(No Model.) 2 Sheets—Sheet 1.
E. F. & L. B. KELLUM.
TOY.
No. 511,084. Patented Dec. 19, 1893.
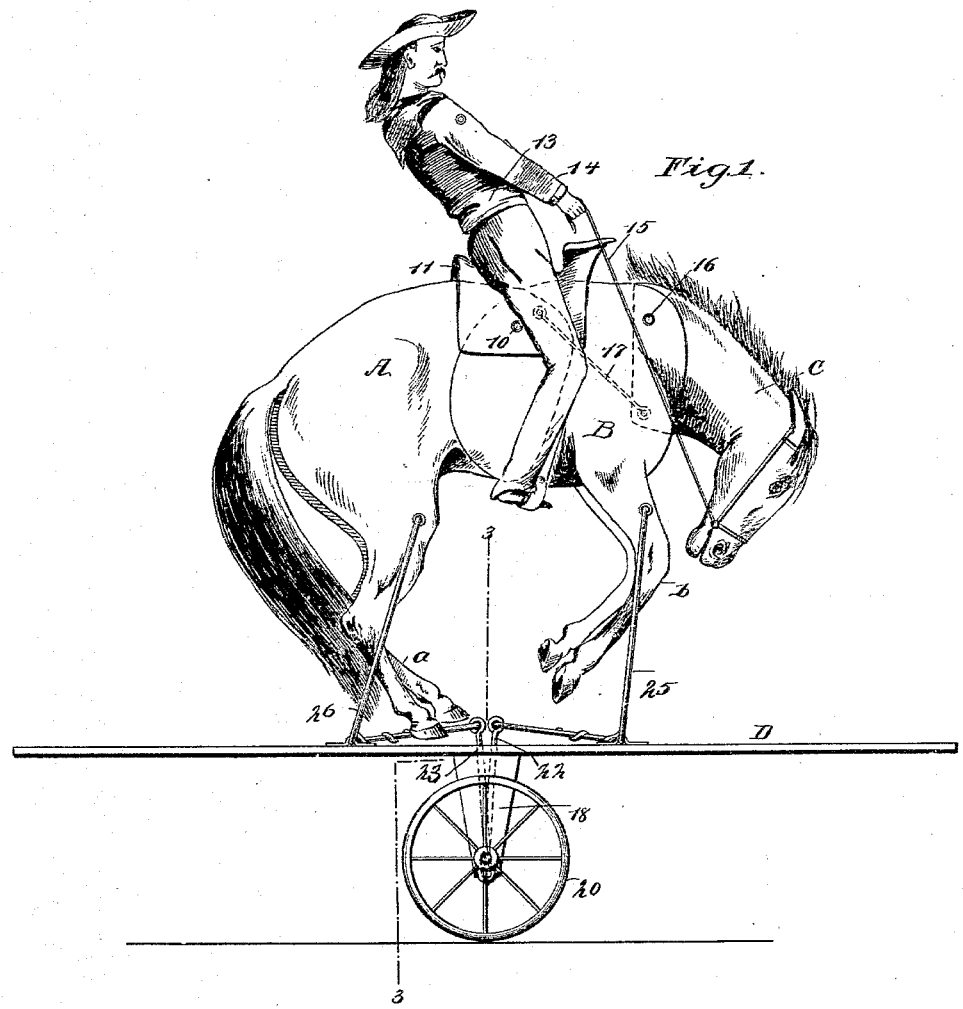
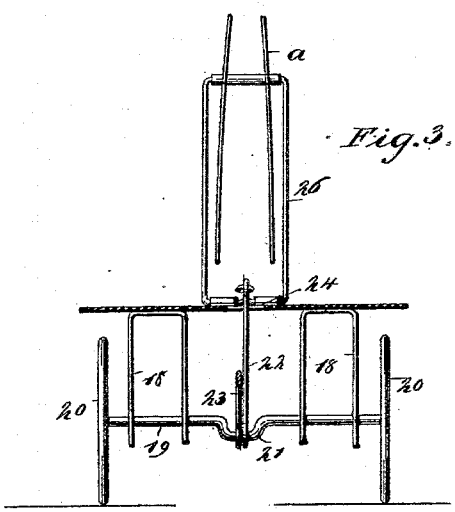
WITNESSES:
John A. Rennie
C. Sedgwick
INVENTORS:
E. F. Kellum
L. B. Kellum
BY Munn & Co
ATTORNEYS.
THE NATIONAL LITHOGRAPHING COMPANY,
WASHINGTON, D. C.

(No Model.) 2 Sheets—Sheet 2.

E. F. & L. B. KELLUM.
TOY.

No. 511,084. Patented Dec. 19, 1893.

WITNESSES:
John A. Rennie
C. Sedgwick

INVENTORS:
E. F. Kellum
L. B. Kellum
BY Munn & Co.
ATTORNEYS.

THE NATIONAL LITHOGRAPHING COMPANY,
WASHINGTON, D. C.

UNITED STATES PATENT OFFICE.

ELMO FINLEY KELLUM AND LEVI BALLARD KELLUM, OF CRIPPLE CREEK, COLORADO.

TOY.

SPECIFICATION forming part of Letters Patent No. 511,084, dated December 19, 1893.

Application filed May 1, 1893. Serial No. 472,495. (No model.)

*To all whom it may concern:*

Be it known that we, ELMO FINLEY KELLUM and LEVI BALLARD KELLUM, of Cripple Creek, in the county of El Paso and State of Colorado, have invented a new and Improved Toy, of which the following is a full, clear, and exact description.

Our invention relates to a toy, and the object of the invention is to provide a mechanical toy representing a bucking broncho and its rider, the toy being so constructed that as it is drawn over any given surface the animal will assume alternately a normal and a bucking position.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1 is a side elevation of the toy, illustrating the animal in bucking position. Fig. 2 is a longitudinal vertical section taken centrally through the toy, the animal being shown in bucking position in positive lines, while in dotted lines the animal is represented as assuming its normal position prior to again bucking; and Fig. 3 is a section taken practically on the line 3—3 of Fig. 1, illustrating the driving mechanism of the toy.

In carrying out the invention the animal is constructed in three sections, a rear section A, which includes a portion of the body, the hind quarters and the rear legs, a forward section B, including the forward quarters a portion of the body and the front legs, and a neck and head section C. The animal may be constructed of any suitable or approved material, and the front and rear body sections are made to turn one in the other, and the two body sections are connected at the center of the body near the upper or back portion by means of a pivot 10. A saddle 11, is preferably placed upon the back of the animal in proper position, but the saddle is independent of the back, and is secured to the outer ends of the pivot 10, and in the saddle the figure of a man 13, is located, the body of the figure being stationary. The arms 14, of the figure, however, are pivotally connected with the body, as the hands are adapted to hold reins 15, connected with the representation of a bit in the mouth of the animal. The neck portion of the head and neck section C, is preferably introduced into the forward end of the forward body section B, and the neck and forward portion of the body are pivotally connected near their upper edges by means of a pivot pin 16. Thus it will be observed that the two body sections may be moved freely upon their pivot, the break occurring near the center of the body beneath the saddle, and that when the forward and rear legs are carried in direction of each other the back of the animal beneath the saddle will be made to hump, assuming a position corresponding to that of the back of a genuine broncho when in the act of bucking. When the back is humped the head of the animal should be carried downward close to the front legs, and this is accomplished by connecting the lower portion of the neck within the forward body section with the upper forward portion of the rear body section through the medium of a link 17, as shown best in Fig. 2. Thus it will be observed that when the body sections are manipulated, carrying the front and the rear legs of the animal in direction of each other, the head will be automatically carried to a lower position, and at the same time the arms of the rider are carried downward to the position they would naturally assume in a rider mounted upon a bucking horse. The reins 15, are preferably made of wire, or like material, so that when the head of the animal is raised, the arms of the rider will be elevated also and will be carried to the natural driving position.

The movement of the animal is accomplished automatically, as the platform D upon which the animal is mounted is drawn forward or pushed backward. The platform D, may be of any desired shape or of any approved construction, and hangers 18, are secured to its lower face, in which an axle 19, is mounted, having attached to its ends wheels 20, and the said axle is provided with a central crank arm 21. Upon the crank arm of the axle two links 22 and 23, are pivotally mounted, which links extend upward through a longitudinal opening 24, made in the center of the platform, the animal being located above this opening with its limbs free from the platform. At each end of the opening 24 in the platform a lever is fulcrumed, the said levers being preferably of an angle or bell-crank pattern, and they are designated in the drawings as 25 and 26. Ordinarily the upper or vertical members of the levers are of a yoke pattern, as shown in Fig. 3; and the yoke members of the levers are pivotally connected respectively with the front and rear legs, a member of each lever extending upward outside of opposite faces of the legs. The rear legs are designated as *a* and the forward legs as *b*.

The horizontal members of the levers are preferably made single, and are connected pivotally with the upper ends of the links 22. Thus it will be observed that as the crank axle 19 is rotated the vertical members of the levers will be alternately carried in direction of one another and away from one another; and when the levers are carried in direction of the center of the platform, the front and rear legs of the animal will be made to approach each other and the back will be humped; at the same time the head and neck will be lowered and the animal will assume the bucking position illustrated in Fig. 1 and shown in dotted lines in Fig. 2. As the axle continues to revolve the vertical members of the levers will be carried away from the center of the platform, or in direction of its ends, and the body of the animal will be straightened, the legs will assume their normal positions and the head and neck will be elevated.

We desire it to be distinctly understood that if in practice it is found desirable, instead of extending the vertical members of the levers outside of the legs of the animal, the said members of the levers may be carried respectively between the front and rear legs and be pivoted to said legs, the pivot point and the greater portion of the vertical members of the levers in this instance being concealed.

In Fig. 2 the dotted lines represent the position of the animal and the position of the levers immediately after the levers have acted to straighten the body. It is evident that when the back of the animal is humped, or when the animal is in bucking position, the saddle and the rider will be carried upward.

Having thus described our invention, we claim as new and desire to secure by Letters Patent—

1. In a toy, a horse, the body of which is made in two sections pivotally connected, the rear legs forming a portion of one section and the forward legs a portion of the other section, the neck being connected with the head, and the neck pivoted in the forward section of the body, a link connection between the neck below its pivot and the rear body section above its pivot, a crank shaft, and a link and lever connection between the crank shaft and the forward and rear sections of the body, whereby the said sections are made to alternately move downward and upward, as and for the purpose specified.

2. A toy representing a bucking broncho, the said toy comprising a representation of an animal the body of which is made in two sections, said sections being pivotally connected near the upper central portion of the body, the rear legs forming a portion of the rear body section and the forward legs a portion of the forward body section, the neck and head of the animal being integral and the neck pivotally connected near the upper portion thereof with the upper portion of the forward body section, a link connecting the neck below its pivot with the rear body section above its pivot, a crank shaft, links projected upward from the crank shaft, bell-crank levers connecting the links with the forward and rear body sections of the animal, and a driving mechanism connected with the crank shaft, as and for the purpose specified.

3. A toy representing a bucking broncho and its rider, the same consisting of the representation of an animal the body of which is in two sections pivotally connected near the central portion of the body, a neck and head section, the neck being pivotally connected at its upper inner portion with the forward body section, a link connection between the neck below its pivot and the rear body section above its pivot, a saddle containing the representation of a man seated therein, the saddle being secured to the extremities of the body pivot, a crank shaft, wheels secured thereon, links projected upward from the crank arm of the crank shaft, and angled levers connected pivotally with the link and the body sections of the animal as and for the purpose set forth.

ELMO FINLEY KELLUM.
   LEVI BALLARD KELLUM.

Witnesses:
 ROBERT WILLIAM MCBRIDE,
 ALUM THEODOR KELLUM.